Sept. 5, 1967 R. J. HARTMEISTER ETAL 3,339,698
CAN UNLOADING AND TRANSFERRING MACHINE
Filed Feb. 4, 1966 4 Sheets-Sheet 1

INVENTORS.
RUBEN J. HARTMEISTER
DANNY L. McMILLIN
NORMAN G. PENNINGTON
BY
Bertha L. MacGregor
ATTORNEY INVENTORS.
RUBEN J. HARTMEISTER
DANNY L. McMILLIN
NORMAN G. PENNINGTON
BY
Bertha L. MacGregor
ATTORNEY Sept. 5, 1967 R. J. HARTMEISTER ETAL 3,339,698
CAN UNLOADING AND TRANSFERRING MACHINE
Filed Feb. 4, 1966 4 Sheets-Sheet 3

INVENTORS.
RUBEN J. HARTMEISTER
DANNY L. McMILLIN
NORMAN G. PENNINGTON
BY
Bertha L. MacGregor
ATTORNEY INVENTORS.
RUBEN J. HARTMEISTER
DANNY L. McMILLIN
NORMAN G. PENNINGTON
BY
Bertha L. MacGregor
ATTORNEY

United States Patent Office 3,339,698
Patented Sept. 5, 1967

3,339,698
CAN UNLOADING AND TRANSFERRING MACHINE
Ruben J. Hartmeister, Golden, Danny L. McMillin, Denver, and Norman G. Pennington, Arvada, Colo., assignors to Coors Porcelain Company, Golden, Colo., a corporation of Colorado
Filed Feb. 4, 1966, Ser. No. 525,246
5 Claims. (Cl. 198—22)

This invention relates to a can unloading and transferring machine designed to unload cans from a "DECO-Chain" carrying cans from an oven or other apparatus, and to transfer the cans to a chute from which they can be picked up by another chain or conveyor for subsequent operations on the cans. A "DECO-Chain" is a chain type conveyor provided with pins which extend horizontally or at a slight angle to the horizontal from the chain at uniformly spaced apart points. This invention will be described herein as a machine for unloading and transferring cans but the word "cans" is intended to include containers of various kinds and materials.

The main object of the invention is to unload and transfer cans having one closed end from a "DECO-Chain" conveyor to another conveyor, in an orderly manner, without injury to the cans or to printed or decorative coatings thereon. Another object is to perform the unloading and transfer in a continuous, very high speed operation, for example, five hundred cans per minute.

An essential element of the invention is a pocket wheel which may be in the form of two star wheels mounted on a common shaft, side by side, with axially aligned pockets, or which may be a single wheel of double peripheral width. Use of two wheels which function as one has some advantages in production and assembling of the machine.

Figure 1:
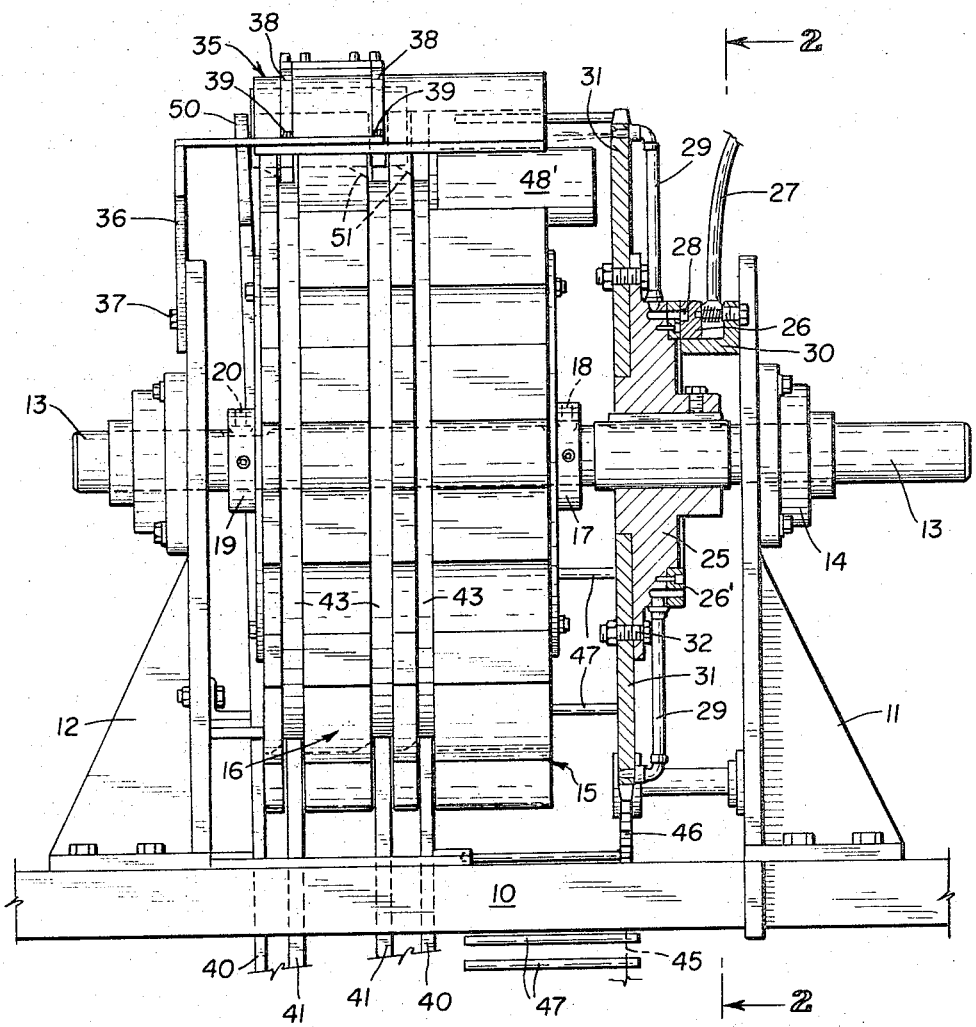
Figure 2:
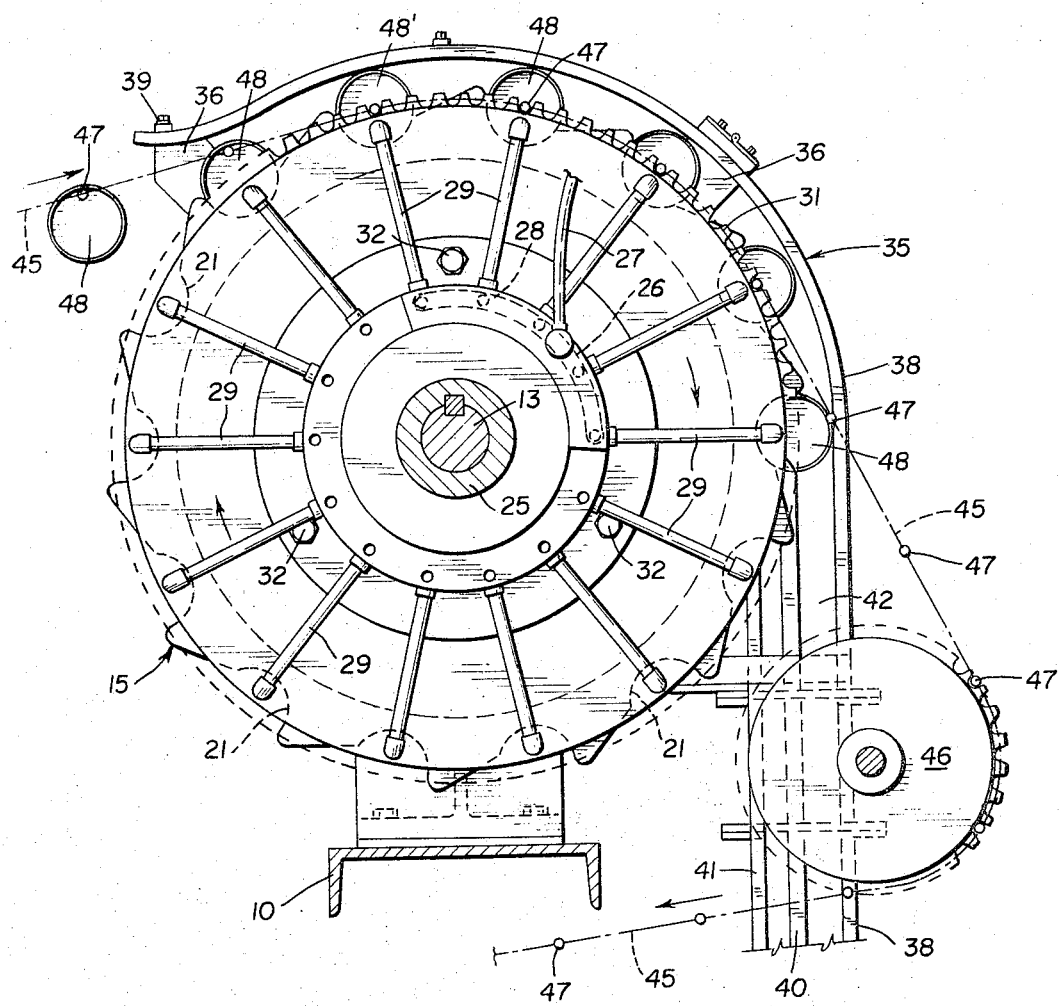
Figure 4:
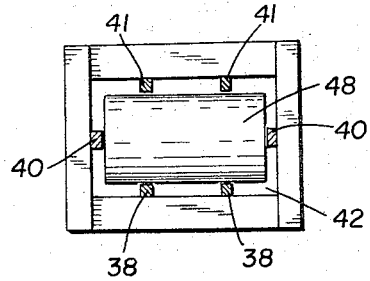
Figure 3:
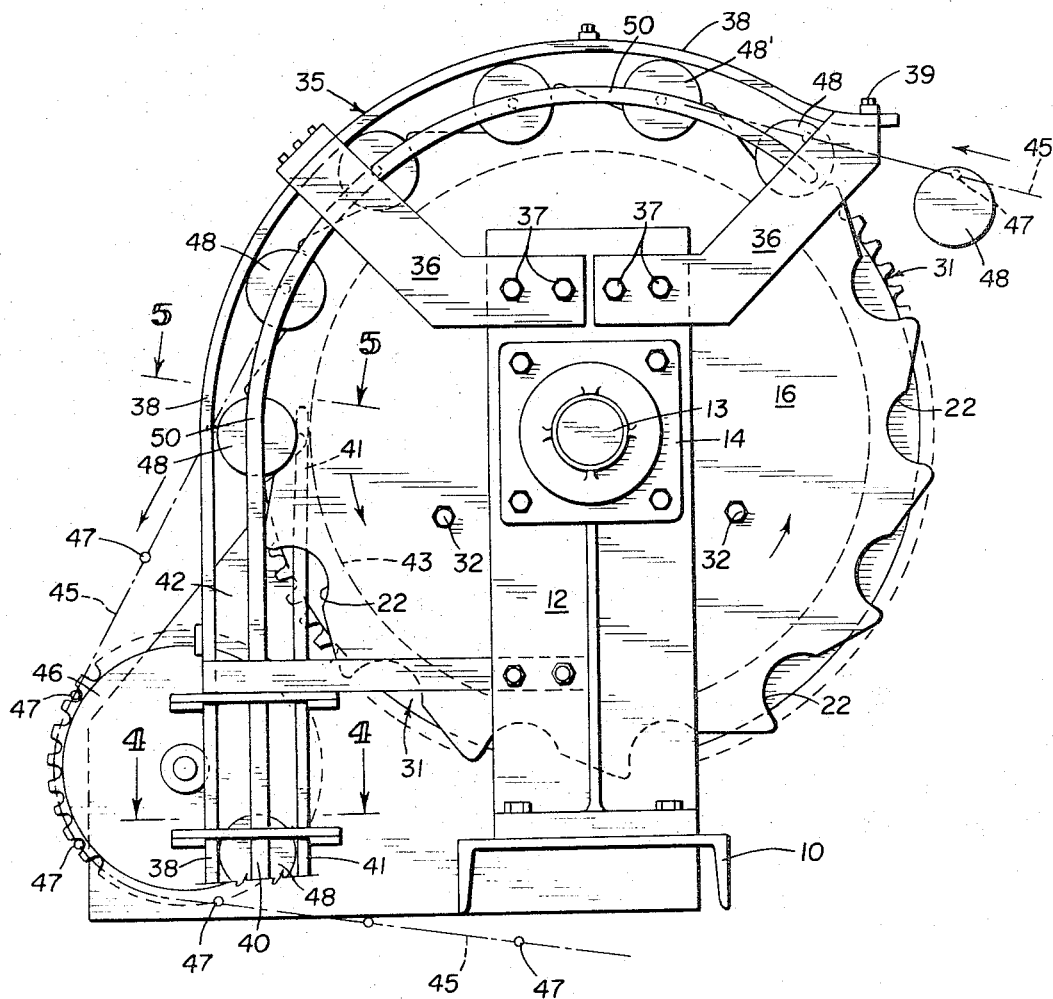
Figure 5:
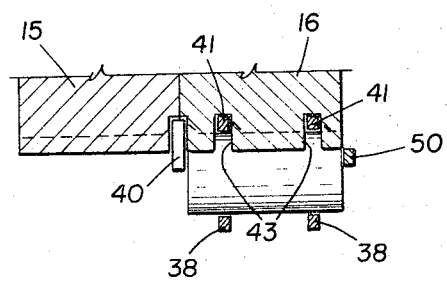
Figure 6:
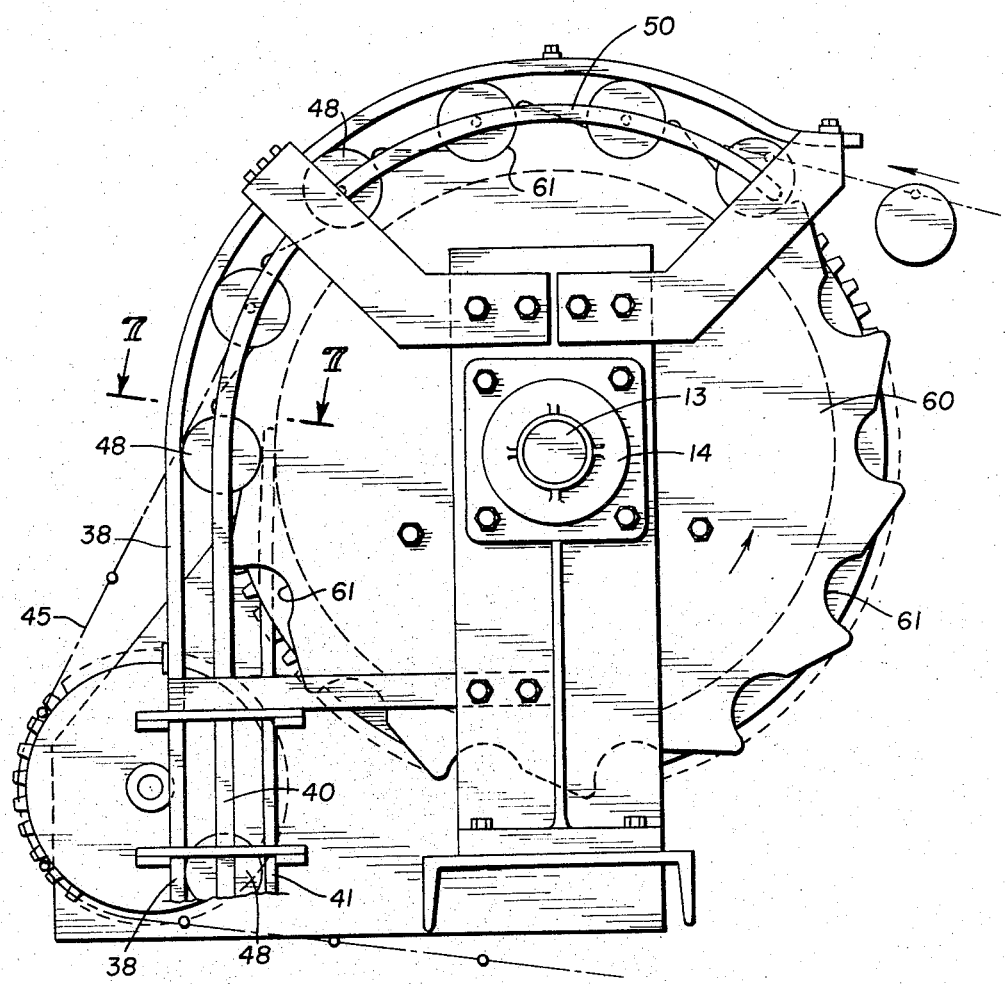
Figure 7:
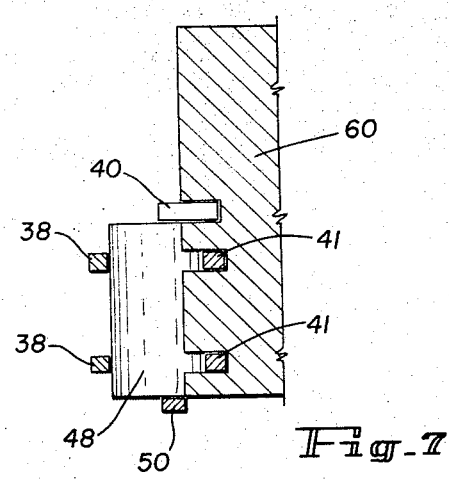

In the drawings:
FIG. 1 is an elevational front view of the can unloading and transfer machine of our invention, showing the peripheral surfaces of a pair of star wheels which are located with their side surfaces adjacent each other, the shaft mounting and air manifold being shown in section.
FIG. 2 is a vertical sectional view in the plane of the line 2—2 of FIG. 1, showing the right hand side surface of the star wheel and other parts of the machine in elevation.
FIG. 3 is an elevational view of the left hand side of the machine.
FIG. 4 is a transverse horizontal sectional view in the plane of the line 4—4 of FIG. 3.
FIG. 5 is a transverse sectional view in the plane of the line 5—5 of FIG. 3.
FIG. 6 is a view similar to FIG. 3, but showing a single pocket wheel in place of the pair of wheels of FIG. 1.
FIG. 7 is a transverse sectional view in the plane of the line 7—7 of FIG. 6.

In that embodiment of the invention shown in the drawings, 10 indicates a base, 11 a right side support, 12 a left side support, 13 a star wheel shaft, 14 wheel bearings, 15 the can receiving star wheel and 16 the unloading star wheel. Star wheel 15 has a flange 17 by which it is mounted on the shaft 13 by set screw 18. Star wheel 16 has a flange 19 by which it is mounted on the shaft by a set screw 20. The wheels 15, 16 are fastened to the shaft in such positions that the pockets 21 of wheel 15 are aligned axially with the pockets 22 of wheel 16. As shown, the two wheels are separate but a single wide wheel may be employed in place of the two shown.

As shown in FIG. 1, a sprocket adapter 25 is keyed to the shaft 13 adjacent the exposed side of star wheel 15. An air manifold 26 is arcuate in form (FIG. 2) and of sufficient arcuate length to provide air to a plurality of pockets 21 of the wheel 15, through air supply conduit 27, port 28 and tubes 29. The manifold 26 is mounted on a bracket 30 attached to the support 11. A sprocket wheel 31 is mounted on the shaft 13 by being connected to the adapter 25 by bolts 32.

A track assembly 35 is located adjacent the periphery of star wheel 16 as shown in FIGS. 1 and 3. The track assembly comprises a frame 36 bolted to the support 12 by bolts 37, and a pair of top guides 38 attached to the frame 36 by bolts 39 and extending from the upper front of the machine over the rearward periphery of the wheel 16 and then vertically downwardly as shown in FIG. 3. Parallel with the lower vertical portion of the outer guide rods 38 are a pair of rods 40, and a pair of inner rods 41. The rods 41 are opposite the rods 38, and spaced from the rods 38 a distance slightly greater than the diameter of cans to be handled. The rods 40 are spaced from each other a distance slightly greater than the length of the cans to be handled by the machine. The rods 38, 40 and 41 define a chute 42 through which cans fall in orderly predetermined manner for conveyance by a chain or other conveyor to other can handling apparatus (not shown). The upper ends of the rods 40 are inclined upwardly and inwardly toward the star wheel 16, and the ends of the rods 41 extend into grooves 43 in the periphery of the wheel 16.

A "DECO-Chain" 45 is trained over the sprocket wheel 31 which drives the sprocket and the shaft 13, and over an idler sprocket wheel 46 to guide the chain to apparatus not a part of this invention. The chain is provided with pins 47 which extend from the chain at a slight angle to the horizontal to prevent cans 48 from sliding off the pins. As shown in FIG. 2, cans 48 are supported on the pins 47 by contact between the pins and the inner surface of the cylindrical body of the cans before they reach the star wheel 15. When a can 48 has been moved by the traveling chain 45 to a pocket 21 of the wheel 15, the can body is raised relatively to the pin 47 although the pin still extends into the can body.

In FIG. 2, the open ends of the cans are facing forwardly. Rotation of the star wheel moves wear plate 26', tubes 29, and the sprocket wheel. With the star wheel, the cans and the chain 45 are also moved at uniform rotary speeds. When one of the air tubes 29 communicates with a port 28 of the manifold 26, the can in the position of can 48' receives air under pressure directed toward the closed end of the can which causes that can to move axially to the left of FIG. 1, off the chain pin 47, from pocket 21 into a pocket 22 of star wheel 16. Continued air pressure is applied to the inside of the can as the star wheels rotate past the manifold 26, the distance of a plurality of pockets, for the purpose of holding the can in a pocket 22 with its closed end bearing against a back stop 50 connected to the outer side of star wheel 16. Thus the cans are carried in the pockets of wheel 16, guided by rods 38, until they reach the chute formed by the rods 38, 40, 41, and fall by gravity in a straight vertical direction downwardly in said chute to a pin-chain or other conveyor.

In moving from star wheel pockets 21 to star wheel pockets 22, the cans 48 move smoothly from star wheel 15 to wheel 16, without encountering any sharp edges adjacent star wheel grooves 43, which merge into the surface of pockets 22 by inclined surfaces 51.

Briefly, the steps of unloading cans from a "DECO-Chain" conveyor and transferring them to another conveyor in orderly manner, without injury to the cans, at high uninterrupted speed, are the following: Depositing cans 48 carried on pins 47 of chain 45 in pockets 21 of star wheel 15 while the pins 47 are located within the cans, rotating the star wheel and cans past an air manifold through which air is directed against the closed inner end of a can to push it in axial direction from pocket 21 of wheel 15, freeing it from pin 47 and pushing it onto the registering pocket 22 of wheel 16 against a back stop 50, carrying the freed can with rotating wheel 16 until it reaches the chute 42 defined by guide rods 38, and rods 40, 41, and drops by gravity to another conveyor (not shown).

It will be apparent from the foregoing description that the machine is simple in construction and capable of high speed operation. In the event a can has become engaged with a "DECO-Chain" pin in such manner that it does not respond to the pressurized air directed into the can to force it off the pin and to move axially from a pocket 21 to a pocket 22, no injury results because the can merely moves with the chain and the star wheel until it is free of the wheel and can be removed from the "DECO-Chain" by other means. The unloading of cans from the "DECO-Chain" and transfer to the chute 42 in orderly predetermined manner is achieved at high speed in a continuous operation and without marring of the cans.

The modification shown in FIGS. 6 and 7 differs from the machine shown in FIGS. 1–5 in that a single pocket wheel 60 replaces the receiving wheel 15 and unloading wheel 16 of FIG. 1.

The wheel 60 is wide enough to provide pockets 61 which are at least as long axially as twice the axial length of the cans being transferred. The pockets 61 perform the same functions as the axially aligned pockets 21 and 22 of wheels 15 and 16, respectively, of FIG. 1. The wheel 60 is mounted on the shaft 13 in bearings 14. The "DECO-Chain" 45, sprocket wheel 46, and the other parts are the same as correspondingly numbered parts heretofore described. Except for the numbering of the single pocket wheel 60 and pockets 61, new FIG. 6 is the same as FIG. 3, but new FIG. 7 shows that the pocket wheel 60 is a single wheel of double width in place of the adjacent wheels 15, 16 of FIGS. 1–5.

In describing the invention, reference has been made to a particular example embodying the same, but we wish it to be understood that the invention is not limited to the construction shown in the drawing and that various changes may be made in the construction and general arrangement of parts without departing from the invention as defined in the appended claims.

We claim:

1. A can unloading and transferring machine adapted to unload cans closed at one end from a conveyor and to transfer the cans from the machine, comprising:
    (a) a pin and chain type conveyor,
    (b) a rotated wheel provided with can receiving pockets extending axially of the wheel in its peripheral surface, said pockets having axial length approximately double the length of the cans to be received therein, said wheel having its receiving side adjacent the conveyor and moving at the same linear speed in position to receive cans in said pockets from said conveyor,
    (c) a pressurized air manifold adjacent said wheel provided with air ports each communicating with a pocket for delivering air into a can in a pocket and thereby moving the can axially in the pocket out of engagement with the conveyor,
    (d) a back stop mounted on the wheel at the side opposite the air manifold against which cans are pushed by the pressurized air, and
    (e) means for receiving the cans from the wheel after they have been moved out of engagement with the conveyor.

2. The machine defined by claim 1, in which the machine is adapted to receive cans in said pockets while the conveyor pins are still within the cans.

3. The machine defined by claim 1, in which the wheel is provided with circumferential grooves extending across the wheel pockets, and in which the pocket surfaces adjacent said grooves are inclined and prevent the cans from encountering obstructing edges as they move axially in the pockets.

4. A can unloading and transferring machine adapted to unload cans closed at one end from a conveyor and to transfer the cans from the machine,
    (a) a pin and chain type conveyor,
    (b) a pair of rotated star wheels provided with can receiving pockets extending axially of the wheels in their peripheral surfaces, the pockets of one wheel being axially aligned with the pockets of the other wheel,
    (c) a sprocket wheel mounted on and rotated with the first of said star wheels, said sprocket wheel driving the chain conveyor at the same linear speed as the star wheel,
    (d) the first star wheel being located adjacent the conveyor in position to receive cans in said pockets while the cans are engaged by the conveyor pins,
    (e) the second of said star wheels being located adjacent the side of the first star wheel and rotated at uniform speed with said first wheel,
    (f) top guide bars extending circumferentially over said second star wheel,
    (g) a pressurized air manifold adjacent said first wheel provided with air ports each communicating with a pocket for delivering air into a can in a pocket and thereby moving the can axially into a pocket of the second star wheel out of engagement with the conveyor pin,
    (h) a back stop mounted on the second star wheel against which cans are pushed by the pressurized air, and
    (i) means for receiving cans from the second wheel.

5. The machine defined by claim 4 in which the second star wheel is provided with circumferential grooves which extend across the pockets, said grooves merging with the pocket surfaces by inclined surfaces, said machine including a chute for receiving cans from the second star wheel, said chute comprising a plurality of rods some of which extend into the grooves of the second star wheel.

References Cited

UNITED STATES PATENTS

| 2,379,713 | 7/1945 | Hohl | 198—211 X |
| 3,036,581 | 5/1962 | Dearsley | 198—32 X |
| 3,158,251 | 11/1964 | Skala et al. | 198—32 |
| 3,228,512 | 1/1966 | Rudszinat et al. | 198—32 X |

FOREIGN PATENTS

| 770,173 | 3/1957 | Great Britain. |

EVON C. BLUNK, Primary Examiner.

M. L. AJEMAN, Assistant Examiner.